US010305655B2

(12) United States Patent
Chen et al.

(10) Patent No.: US 10,305,655 B2
(45) Date of Patent: May 28, 2019

(54) REPORTING OF CHANNEL STATE INFORMATION (CSI) FEEDBACK BY A USER EQUIPMENT

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US); Juan Montojo, San Diego, CA (US); Tao Luo, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 15/457,697

(22) Filed: Mar. 13, 2017

(65) Prior Publication Data
US 2018/0102887 A1 Apr. 12, 2018

Related U.S. Application Data

(60) Provisional application No. 62/405,669, filed on Oct. 7, 2016.

(51) Int. Cl.
*H04L 5/00* (2006.01)
*H04W 4/70* (2018.01)
(Continued)

(52) U.S. Cl.
CPC ......... *H04L 5/0048* (2013.01); *H04B 7/0626* (2013.01); *H04B 7/0695* (2013.01);
(Continued)

(58) Field of Classification Search
None
See application file for complete search history.

(56) References Cited

U.S. PATENT DOCUMENTS 9,236,916 B2 1/2016 Wernersson et al.
9,467,262 B2 10/2016 Wang et al.
(Continued)

FOREIGN PATENT DOCUMENTS

WO WO-2012/112281 A2 8/2012
WO WO-2013/024942 A1 2/2013

OTHER PUBLICATIONS

Huawei et al., "DL RS Design for NR CSI Acquisition and Beam Management", 3GPP DRAFT; R1-1608817, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 1, 2016, XP051159144, Retrieved from the Internet: URL:http://www.3gpp.org/ftp/tsg_ran/WG1_RL1/TSGR1_86b/Docs/ [retrieved on Oct. 1, 2016], 7 pages.
(Continued)

*Primary Examiner* — Saumit Shah
(74) *Attorney, Agent, or Firm* — Arent Fox LLP

(57) ABSTRACT

The present disclosure describes a method, an apparatus, and a computer readable medium for reporting channel state information (CSI) feedback by a user equipment (UE). For example, the method may include identifying a plurality of reference signal (RS) configurations, determining a preferred RS configuration from the plurality of the RS configurations identified at the UE, and reporting the preferred RS configuration to the node. The present disclosure further includes receiving channel state information (CSI) feedback at a node which includes transmitting a plurality of reference
(Continued)

signals to a plurality of user equipments (UEs) and receive a preferred RS configuration from at least a UE of the plurality of the UEs.

27 Claims, 8 Drawing Sheets

(51) Int. Cl.
    *H04B 7/06*     (2006.01)
    *H04W 72/04*     (2009.01)
    *H04W 24/10*     (2009.01)
    *H04L 1/00*     (2006.01)

(52) U.S. Cl.
    CPC ............ *H04L 5/005* (2013.01); *H04L 5/0057* (2013.01); *H04W 4/70* (2018.02); *H04W 24/10* (2013.01); *H04W 72/0413* (2013.01); *H04L 1/0026* (2013.01)

(56) References Cited

U.S. PATENT DOCUMENTS

| | | | |
|---|---|---|---|
| 2015/0341097 A1 | 11/2015 | Yang et al. | |
| 2016/0056871 A1* | 2/2016 | Kakishima | H04B 7/0413 370/336 |
| 2016/0323029 A1 | 11/2016 | Cheng et al. | |
| 2017/0111886 A1* | 4/2017 | Kim | H04W 72/042 |
| 2017/0338877 A1* | 11/2017 | Yum | H04B 7/0626 |
| 2018/0123654 A1* | 5/2018 | Park | H04B 7/0417 |
| 2018/0124624 A1* | 5/2018 | Chen | H04W 24/10 |

OTHER PUBLICATIONS

International Search Report and Written Opinion issued in International Patent Application No. PCT/US2017/055177, dated Jan. 22, 2018 (17 pages).

Huawei: "CSI Measurement and Feedback for eMTC," R1-156484, 3GPP TSG RAN WG1 Meeting #83, Anaheim, USA, Nov. 15-22, 2015, pp. 1-5.

* cited by examiner

REPORTING OF CHANNEL STATE INFORMATION (CSI) FEEDBACK BY A USER EQUIPMENT

CLAIM OF PRIORITY

The present application for patent claims priority to U.S. Provisional Patent Application No. 62/405,669, filed Oct. 7, 2016, entitled "Reporting of Channel State Information (CSI) Feedback by a User Equipment (UE)," which is assigned to the assignee hereof, and hereby expressly incorporated by reference herein.

INTRODUCTION

The present disclosure relates generally to communication systems, and more particularly, reporting of channel state information (CSI) feedback.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. For example, 5G NR (new radio) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with requirements, especially in terms of latency and reliability; and massive machine type communications for a very large number of connected devices, and typically transmitting a relatively low volume of non-delay-sensitive information. However, as the demand for mobile broadband access continues to increase, there exists a need for further improvements in 5G communications technology and beyond. Preferably, these improvements should be applicable to other multi-access technologies and the telecommunication standards that employ these technologies.

Thus, there is a desire to provide an improved mechanism, for example, a less complex mechanism with less overhead, for reporting CSI feedback from an UE to a base station or eNode B.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

SUMMARY

Figure 1:
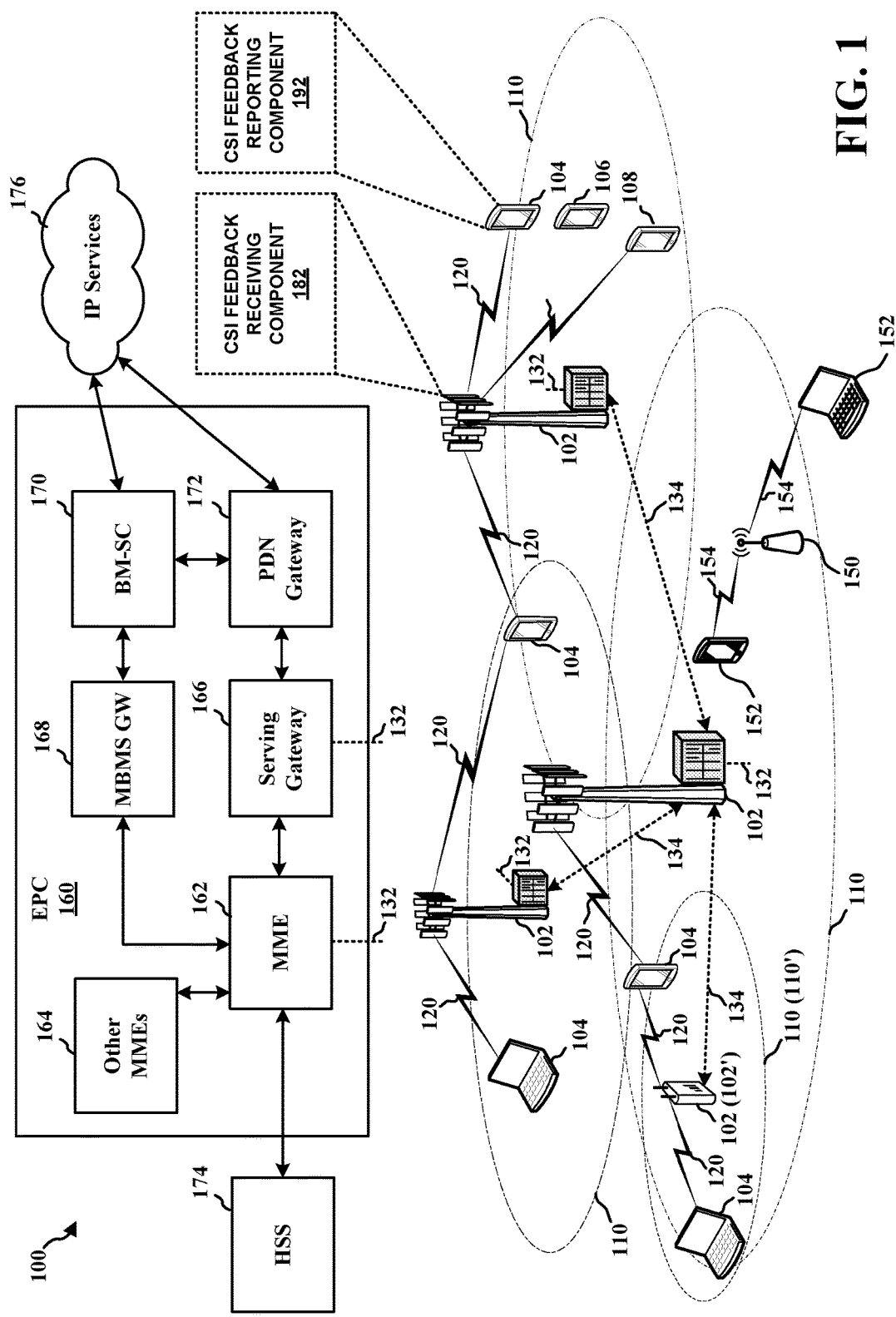
FIG. 1 is a diagram illustrating an example of a wireless communications system and an access network, in accordance with various aspects of the present disclosure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example method for reporting channel state information (CSI) feedback by a user equipment (UE) is provided. The method includes identifying, at the UE, a plurality of reference signal (RS) configurations, wherein each of the plurality of RS configurations is associated with a RS transmission received from a node and at least one RS configuration is associated with a narrowband; determining a preferred RS configuration from the plurality of the RS configurations identified at the UE; and reporting the preferred RS configuration to the node. In another example, a method for receiving channel state information (CSI) feedback at a node is provided. The method includes transmitting, from the node, a plurality of reference signals to a plurality of user equipments (UEs); and receiving, at the node, a preferred RS configuration from at least a UE of the plurality of the UEs.

Further, an example apparatus for reporting channel state information (CSI) feedback by a user equipment (UE) is provided. The apparatus includes a memory configured to store data; and one or more processors communicatively coupled with the memory, wherein the one or more processors and the memory are configured to identify, at the UE, a plurality of reference signal (RS) configurations, wherein each of the plurality of RS configurations is associated with a RS transmission received from a node and at least one RS configuration is associated with a narrowband; determine a preferred RS configuration from the plurality of the RS configurations identified at the UE; and report the preferred RS configuration to the node. In another example, an apparatus for receiving channel state information (CSI) feedback at a node is provided. The apparatus includes a memory configured to store data; and one or more processors communicatively coupled with the memory, wherein the one or more processors and the memory are configured to transmit, from the node, a plurality of reference signals to a plurality of user equipments (UEs); and receive, at the node, a preferred RS configuration from at least a UE of the plurality of the UEs.

Furthermore, an example apparatus for reporting channel state information (CSI) feedback by a user equipment (UE) is provided. The apparatus includes means for identifying, at the UE, a plurality of reference signal (RS) configurations, wherein each of the plurality of RS configurations is associated with a RS transmission received from a node and at least one RS configuration is associated with a narrowband; means for determining a preferred RS configuration from the plurality of the RS configurations identified at the UE; and means for reporting the preferred RS configuration to the node. In another example, an apparatus for receiving channel state information (CSI) feedback at a node is provided. The apparatus includes means for transmitting, from the node, a plurality of reference signals to a plurality of user equipments (UEs); and means for receiving, at the node, a preferred RS configuration from at least a UE of the plurality of the UEs.

Additionally, an example non-transitory computer readable medium storing computer executable code for reporting channel state information (CSI) feedback by a user equipment (UE) is provided. The computer readable medium includes code for identifying, at the UE, a plurality of reference signal (RS) configurations, wherein each of the plurality of RS configurations is associated with a RS transmission received from a node and at least one RS configuration is associated with a narrowband; code for determining a preferred RS configuration from the plurality of the RS configurations identified at the UE; and code for reporting the preferred RS configuration to the node. In another example, a non-transitory computer readable medium storing computer executable code for receiving channel state information (CSI) feedback at a node is provided. The non-transitory computer readable medium includes code for transmitting, from the node, a plurality of reference signals to a plurality of user equipments (UEs); and code for receiving, at the node, a preferred RS configuration from at least a UE of the plurality of the UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

In a new radio (NR), base stations (also referred to as nodes, eNBs, eNodeBs, cells, etc.) and/or UEs are equipped with a large number of antennas which may result in downlink (DL) and uplink (UL) transmissions using beams, specifically for higher carrier frequencies. Each beam may be associated with one antenna port and may be implemented via an analog beamforming, digital beamforming, and/or a combination of both. The beamforming (also referred to as beam-based operations) may be associated with common procedures (e.g., initial access) and/or UE-specific procedures (e.g., unicast traffic, etc.).

In 3rd Generation Partnership Project (3GPP) Release 12, machine-type communications (MTC) is supported in wideband (e.g., up to 20 MHz) with reduced UE complexity (e.g., one 1 Receive (Rx) antenna, half-duplex, etc.), without coverage enhancements, and enhanced discontinuous reception (DRX), for example, deep sleep mode, for power efficient operations.

In 3GPP Release 13, enhanced MTC (eMTC) and narrow band-Internet of Things (NB-IoT) are supported. eMTC may support up to 1 MHz bandwidth and NB-IoT may support 180 KHz bandwidth with extended coverage (up to 155.7 dB max coupling loss for eMTC and 164 dB for NB-IoT). However, there is limited or no CSI feedback in eMTC/NB-IoT, especially for large coverage extension cases, to simplify the operation, complexity, and/or cost. Additionally, in eMTC/NB-IOT, downlink/uplink transmissions for packets may utilize a large number of sub-frames, e.g., TTI bundling, to improve coverage. For example, 2048 sub-frames may be used. The bundled transmissions may also use sub-band hopping, transmitting in one 6-RB sub-band for 8 sub-frames and then hop to a different 6-RB sub-band. Further, a gap between the hopping may allow for radio frequency (RF) re-tuning of from one sub-band to another sub-band.

With the introduction of mMTC, dense deployment of mMTC is supported. For example, 1 million devices/km2 with 160 bps under 164 dB minimum coupling loss (MCL). However, this could be challenging to achieve with higher carrier frequencies as there is no CSI feedback from the UEs to the base station.

The present aspects generally relate to reporting of CSI feedback by a user equipment and/or receiving CSI feedback at a base station.

In an aspect, UE may include a CSI feedback reporting component to identify reference signal (RS) configurations associated with RS transmissions received from a base station. The RS configurations may include at least one RS configuration that is associated with a narrowband to support mMTC devices. The UE 104 may determine a preferred RS configuration from the RS configurations identified at the UE and report the preferred RS configuration to the node. In an additional aspect, a base station may include a CSI feedback receiving component to transmit reference signals to a plurality of user equipments (UEs) and receive preferred RS configurations from the plurality of UEs.

Thus, based on the present aspects, operation of the CSI feedback reporting component and/or CSI feedback receiving component described herein will provide a feedback mechanism from the UEs to the base station to reduce complexity and/or overhead associated with supporting mMTC.

FIG. 1 is a diagram illustrating an example of a wireless communications system and an access network 100 including at least one base station or node 102 configured to include a CSI feedback receiving component 182 for receiving CSI feedback from at least one UE 104 configured to include a CSI feedback reporting component 192 in accordance with various aspects of the present disclosure. The wireless communications system 100 (also referred to as a wireless wide area network (WWAN)) includes base stations 102, UEs 104, and an Evolved Packet Core (EPC) 160. The base stations 102 may include macro cells (e.g., high power cellular base stations) and/or small cells (e.g., low power cellular base stations). The macro cells include eNBs. The small cells include femtocells, picocells, and/or microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved NodeBs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell). Although base stations 102 may operate with a system bandwidth of, e.g., Y MHz and transmit a RS with a bandwidth of Z MHz (e.g., 5 MHz), UEs 104, 106, and/or 108 may monitor the RS transmissions based on the capabilities of the UEs. For example, UEs 104 and 106 may be mMTC devices and may monitor less than 5 MHz, e.g., 1 MHz or 500 KHz of the 5 MHz RS transmitted by base station and/or UE 108 may be a broadband device and may monitor entire 5 MHz.

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 102 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, a node, an access point, a base transceiver station, a radio base station, a radio transceiver, a transceiver function, a basic service set (BSS), an extended service set (ESS), or some other suitable terminology. The eNB 106 provides an access point to the EPC 160 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 102 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
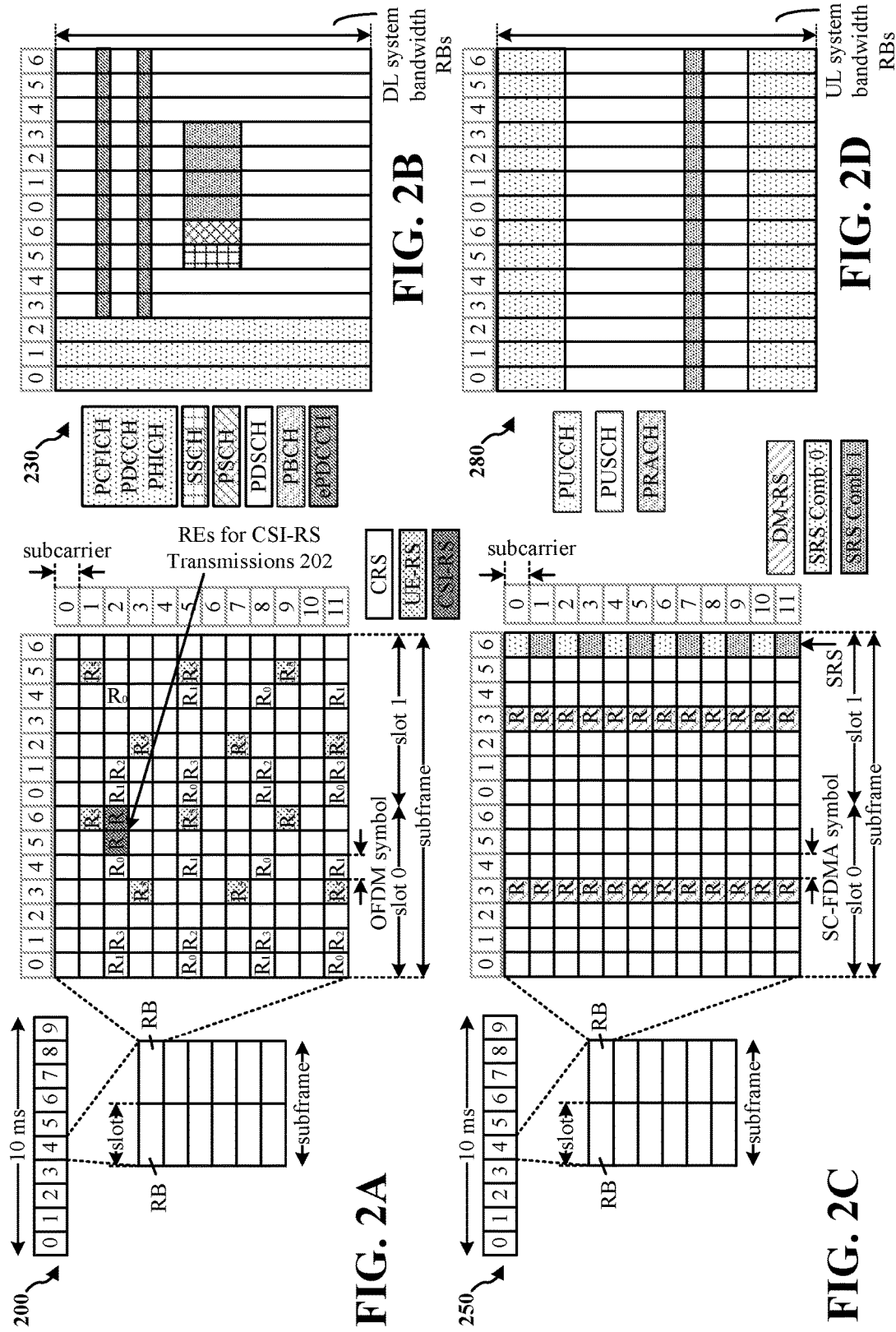
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE, which may be an example of a frame structure that may be transmitted by at least one base station 102 for transmitting RSs from the base station and used by UE 104 as described herein, in accordance with various aspects of the present disclosure. FIG. 2B is a diagram 230 illustrating an example of channels within the DL frame structure in LTE that may be transmitted by base station 102 and used by UE 104 as described herein. FIG. 2C is a diagram 250 illustrating an example of an UL frame structure in LTE that may be used by UE 104. FIG. 2D is a diagram 280 illustrating an example of channels within the UL frame structure in LTE that may be used by UE 104. Other wireless communication technologies may have a different frame structure and/or different channels.

Referring to FIG. 2A, in LTE, a frame (10 ms) may be divided into 10 equally sized sub-frames. Each sub-frame may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, a RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, a RB contains 12 consecutive subcarriers in the frequency domain and 6 consecutive symbols in the time domain, for a total of 72 REs. The number of bits carried by each RE depends on the modulation scheme. Additionally, the RBs described above may also be referred to as "resources," "orthogonal resources," etc. in the present disclosure.

As illustrated in FIG. 2A, some of the REs carry DL reference (pilot) signals (DL-RS) for channel estimation at the UE. The DL-RS may include cell-specific reference signals (CRS) (sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). For example, base station 102 may use resources indicated by "R" 202 for transmitting the CSI-RSs (also referred to as RSs or RS transmissions) which may be monitored by the UEs, e.g., UEs 104, 106, and/or 108 for identifying the associated RS configurations configured at the UE, determining the preferred RS configuration, and/or reporting the preferred RS configuration to the base station 102.

FIG. 2B illustrates an example of various channels within a DL sub-frame of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE, e.g., UE 104, may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within sub-frames 0 and 5 of a frame, and carries a primary synchronization signal (PSS) that is used by a UE to determine sub-frame timing and a physical layer identity. The secondary synchronization channel (SSCH) is within symbol 5 of slot 0 within sub-frames 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of sub-frame 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a sub-frame. The SRS may have a comb structure, and a UE, e.g., UE 104, may transmit SRS on one of the combs. The SRS may be used by an eNB for channel quality estimation to enable frequency-dependent scheduling on the UL.

FIG. 2D illustrates an example of various channels within an UL sub-frame of a frame. A physical random access channel (PRACH) may be within one or more sub-frames within a frame based on the PRACH configuration. The PRACH may include six consecutive RB pairs within a sub-frame. The PRACH allows the UE, e.g., UE 104, to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
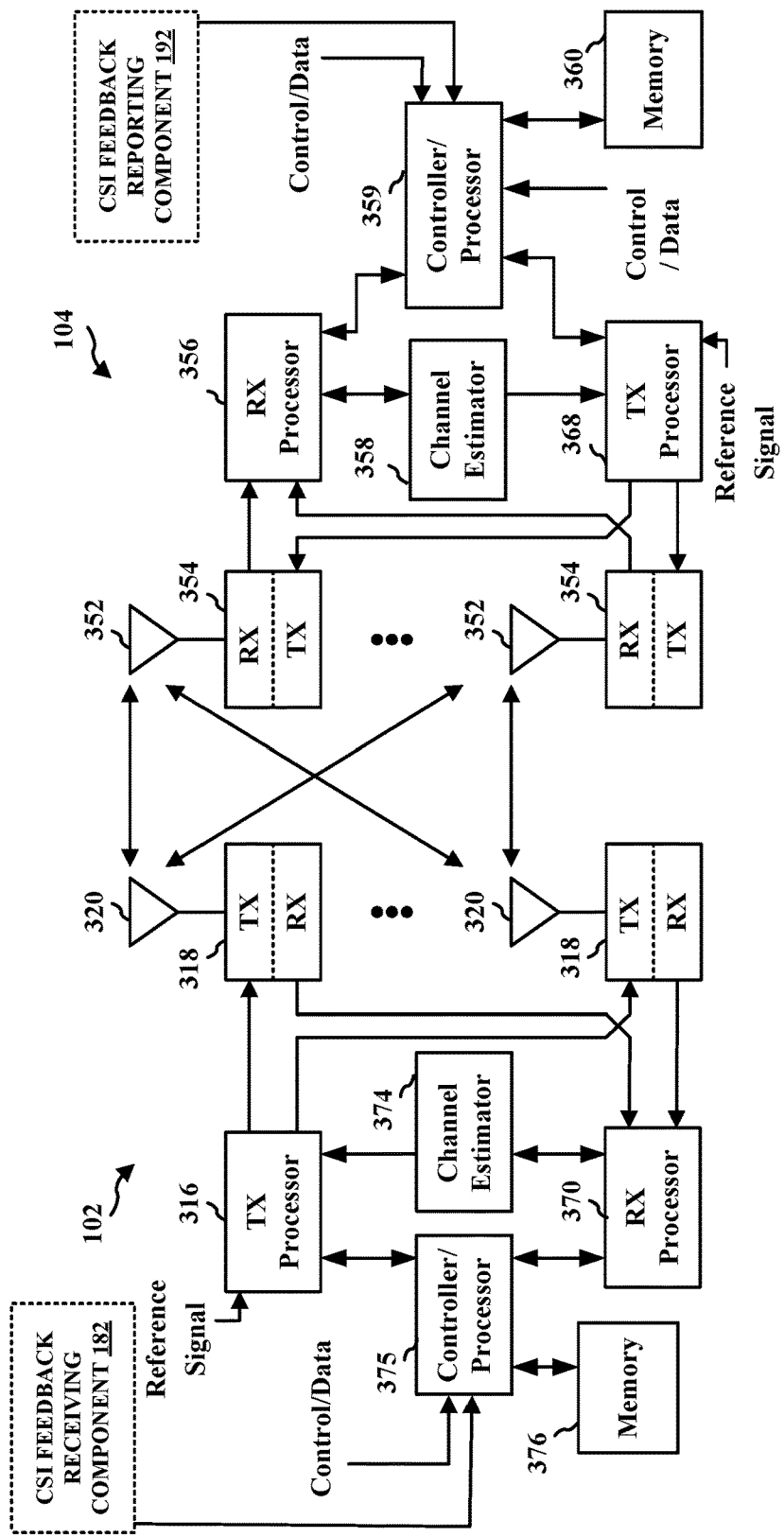
FIG. 3 is a block diagram of a base station in communication with a UE in an access network.

FIG. 3 is a block diagram of an eNB 102 in communication with UE 104 in an access network. In an aspect, base station 102 may be configured to include CSI feedback receiving component 182 to receive CSI feedback at the base station and/or UE 104 may be configured to include CSI reporting component 192 to report CSI feedback from the UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
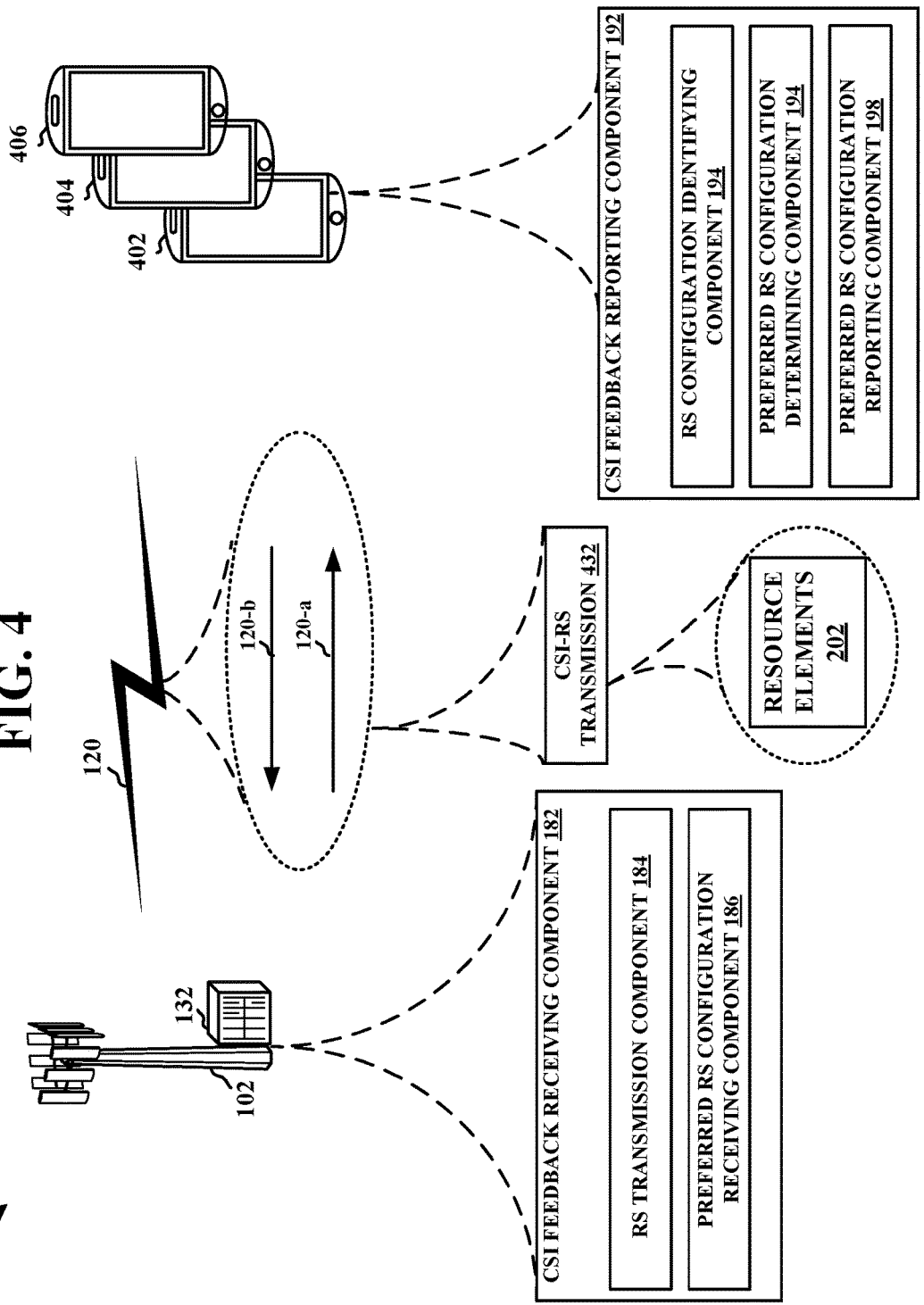
FIG. 4 is a block diagram of a wireless communications system including a user equipment and/or a base station having in accordance with various aspects of the present disclosure.

Referring to FIG. 4, in an aspect, a wireless communications system 400 (which may be the same as or similar to wireless communications system and an access network 100 of FIG. 1) includes a plurality of UEs (UEs 402, 404, and 406, which may be the same or similar to UEs 104, 106, and 108, respectively, of FIG. 1) in communication coverage of at least one base station 102. The base station 102 (collectively referred to as Evolved Universal Mobile Telecommunications System (UMTS) Terrestrial Radio Access Network (E-UTRAN)) may interface with an EPC (such as EPC 160 of FIG. 1) through backhaul links 132 (e.g., S1 interface). In an aspect, base station 102 may include one or more processors (not shown) and, optionally, memory (not shown), that may operate in combination with CSI feedback receiving component 182 for receiving CSI feedback from the UEs. In an additional aspect, UE 104 may include one or more processors (not shown) and, optionally, memory (not shown), that may operate in combination with CSI feedback reporting component 192 for reporting CSI feedback to the base station.

Base station 102 which may include CSI feedback receiving component 182 may send RS transmissions, e.g., CSI-RS 432 (which may be same or similar to RSs transmitted by base station 102 of FIG. 1) using REs 202 on downlink 120-*a* (only one downlink shown for simplicity) to one or more UEs, e.g., 402, 404, and/or 406. Although three UEs are shown in FIG. 4, the present disclosure is not limited to three UEs and more or fewer UEs may be used. Additionally, any number of RSs may be used. In an aspect, base station 102 may transmit two or more RSs, and the two or more RSs may be time division multiplexed in different symbols in a same transmission time interval (TTI)/subframe, across subframes, or frequency division multiplexed in a same symbol. In an additional aspect, base station 102 may repeat transmission of at least one RS of the two or more RSs over multiple subframes. UE 104 which may include CSI feedback reporting component 192, based on monitoring of RS transmissions from base station 102, may identify a plurality of RS configurations associated with the received RS transmissions. Additionally, UE 104 may determine a preferred RS configuration and report the preferred RS configuration on uplink 120-*b* (only one uplink shown for simplicity) to the base station 102. It should be noted that one of the RS configurations may be associated with a narrow band to support mMTC devices as one or more of UEs 402, 404, and/or 406 may be mMTC devices.

Base station 102 may include a CSI feedback receiving component 182 for receiving channel state information (CSI) feedback at the base station. Base station 102 and/or CSI feedback receiving component 182 may further include a RS transmission component 184 to transmit a plurality of reference signals to one or more UEs and/or a preferred RS configuration receiving component 186 to receive a preferred RS configuration from at least a UE of the one or more UEs. In an additional aspect, UE CSI feedback reporting component 192 may include a RS configuration identifying component 194, preferred RS configuration determining component 196, and/or a preferred RS configuration reporting component 198.

Figure 5:
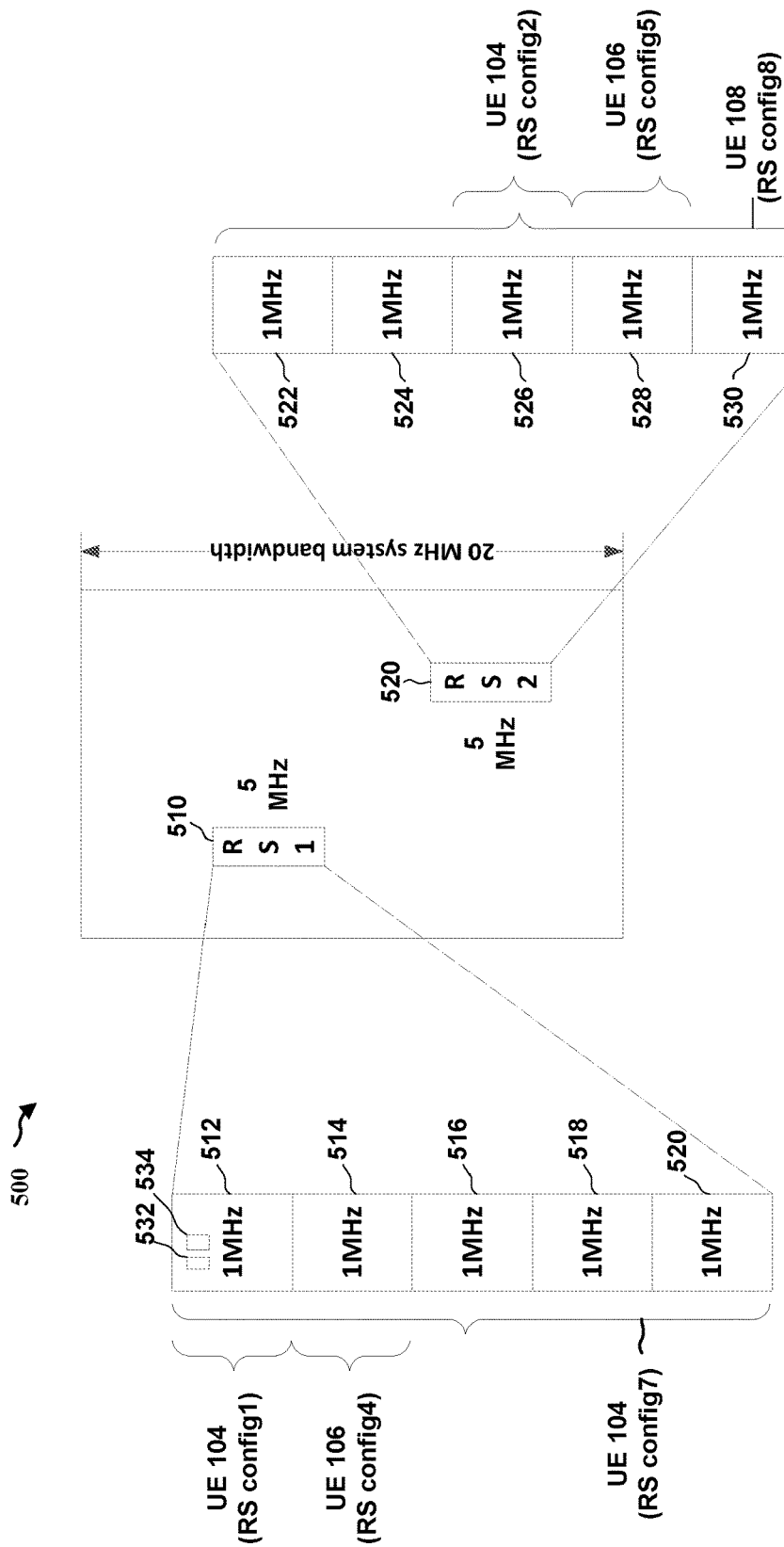
FIG. 5 illustrates an example of RS transmissions from a base station and/or receiving of the RS transmissions at a user equipment.

FIG. 5 illustrates an example transmission of one or more reference signals (RSs) 500 by a base station and/or monitoring of the one or more RSs by one or more UEs, in an aspect of the present disclosure.

In an example aspect, base station 102, with a system bandwidth of 20 MHz, may transmit two RSs, e.g., RS1 510 and RS2 520, each with a bandwidth of 5 MHz. A RS is generally defined as a signal that exists at a physical (PHY) layer to deliver a downlink power reference point for the UEs (e.g., UEs 104, 106, and/or 108). That is, when a UE tries to determine the DL power of base station 102, the UE measures the power of the RS and considers the measured power of the RS as the downlink power of the base station. As described above in reference to FIG. 2A, the RSs are carried by specific resource elements (REs), in each slot, and the location of the REs are specifically determined by the antenna configuration. For example, FIG. 2A shows a CSI-RS for antenna port 15 indicated as R 202. In an aspect, RS1 510 and/or RS2 520 may be configured to support mMTC devices and each of the RSs may be associated with a corresponding beam, beamforming, or precoding.

A UE may be configured with a CSI-RS process and each CSI-RS process may be associated with one or more RS configurations. A RS configuration is generally defined for a UE and may include a set of resources of the RS configuration—e.g., REs 202; one or more antenna ports—e.g., port 15; one or more sub-bands, or a periodicity of the RS transmission, or a combination thereof. For example, in an aspect, UE 104 may be configured with RS configurations "RS config1" associated with RS 1 510 and/or "RS config2" associated with RS2 520. Similarly, UE 106 may be configured with RS configurations "RS config4" associated with RS1 510 and/or "RS config5" associated with RS2 520; and/or UE 108 may be configured with RS configurations "RS config7" associated with RS 1 510 and/or "RS config8" associated with RS2 520. Although only two RS configurations per UE are shown in FIG. 5, the disclosure is not limited to two RS configuration per UE.

On the receiving end, UEs monitor the RS transmissions from base station 102. For example, UEs 104, 106, and/or 108 may monitor the RS transmissions from base station 102. In an aspect, a UE may monitor the entire 5 MHz RS transmissions or some portions of the 5 MHz RS transmissions based on the RS configurations at the UE and/or the capabilities of the UE. For instance, UE 104 (which may be a mMTC device) may monitor the first 1 MHz 512 of RS 1 510 based on RS config1 at UE 104; UE 106 (which may be a mMTC device) may monitor the second 1 MHz 514 of RS1 510 based on the RS config4 at UE 106; and/or UE 108 (which may be a wideband device) may monitor the entire 5 MHz transmission based on the RS config7 at UE 108. Additionally, UE 104 may monitor the third 1 MHz 526 of RS 2 520 based on RS config2 at UE 104; UE 106 may monitor the fourth 1 MHz 528 of RS2 520 based on the RS config5 at UE 106; and/or UE 108 may monitor the entire 5 MHz transmission of RS 2 520 based on RS config8 at UE 108. In other words, the bandwidth of a RS that UE monitors may be based on the capability of the UE and/or a configuration from an base station for a CSI process. Although, FIG. 5 shows different RS configurations of a UE (e.g., RS config1 and RS config2 of UE 104) monitoring similar bandwidth (e.g., 1 MHz), the UEs may monitor different size bandwidths in different configurations. That is, for example, UE 104 may monitor 1 MHz of a first RS in one configuration and may monitor 500 KHz of a second RS in another RS configuration.

In an aspect, UE 104 and/or CSI feedback reporting component 192 may monitor the RS transmissions based on RS configurations (e.g., RS config1 and RS config2), determine a preferred RS configuration (e.g., RS config1) based on RSRP and/or CQI of the RS transmissions, and report the preferred RS configuration to the base station. This feedback mechanism allows mMTC devices to benefit from beam based operations with low complexity and/or overhead as further described below.

Figure 6:
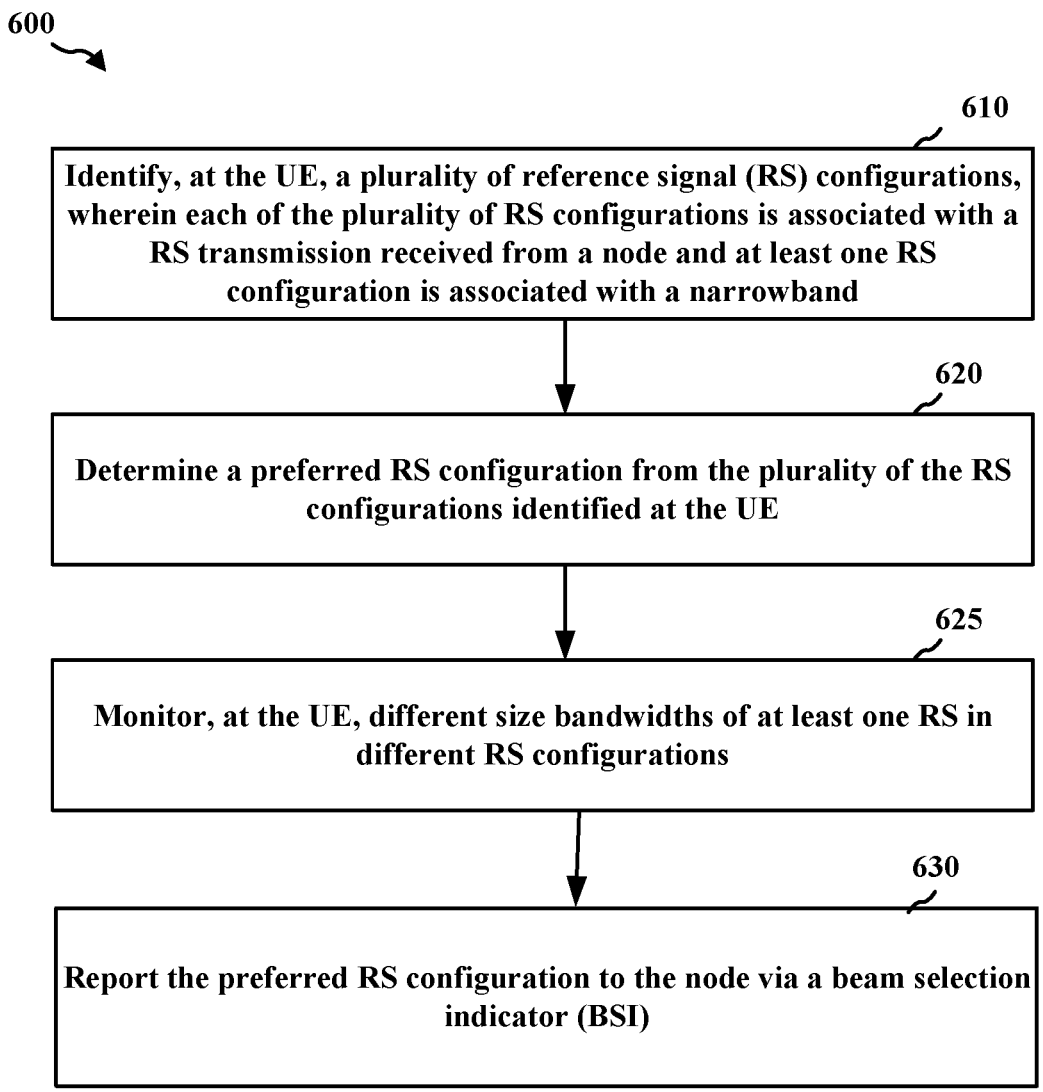
FIG. 6 is a flowchart illustrating a method for reporting CSI feedback by a user equipment.

FIG. 6 is a flowchart illustrating a method 600 for reporting channel state information (CSI) feedback by a user equipment.

In an aspect, at block 610, methodology 600 may include identifying, at the UE, a plurality of reference signal (RS) configurations, wherein each of the plurality of RS configurations is associated with a RS transmission received from a node and at least one RS configuration is associated with a narrowband. For example, in an aspect, UE 104 and/or CSI feedback reporting component 192 may include a RS configuration identifying component 194, such as a specially programmed processor module, or a processor executing specially programmed code stored in a memory, to identify a plurality of RS configurations, e.g., RS config1 and RS config2 associated with RS transmissions RS 1 510 and RS 2 520, respectively, which are received from the base station 102.

As described above in reference to FIG. 5, base station 102 may transmit a plurality of RSs, also referred to as RS transmissions. UE 104 and/or CSI feedback reporting component 192 may identify the RS configurations, e.g., RS config1 and RS config2 respectively associated with transmissions RS1 510 and RS2 520 based on the CSI processes configured at the UE 104 and the received RS transmissions. As further described above in reference to FIG. 5, the RS configurations, e.g., RS config1 and RS config2 may be associated with narrow bands, e.g., 512 and 526 for supporting mMTC devices.

In an aspect, at block 620, methodology 600 may include determining a preferred RS configuration from the plurality of the RS configurations identified at the UE. For example, in an aspect, UE 104 and/or CSI feedback reporting component 192 may include a preferred RS configuration determining component 196, such as a specially programmed processor module, or a processor executing specially programmed code stored in a memory, to determine a preferred RS configuration (e.g., RS config1) from the RS configurations, e.g., RS config1 and RS config2 identified at UE 104.

UE 104 and/or preferred RS configuration determining component 196 may compute the reference signal received power (RSRP) and/or channel quality indicator (CQI) values of each of the RS transmissions associated with each of plurality of RS configurations identified at the UE. That is, for example, UE 104 may compute RSRP and/or CQI values of RS transmissions 512 and 522 (associated with RS1 510 and RS 2 520, respectively) and determine the preferred RS configuration based on which RS transmission has better (i.e., higher) RSRP and/or CQI values. In an aspect, where both the RS transmissions have the same values for RSRP and/or CQI, UE 104 and/or preferred RS configuration determining component 196 may determine the preferred RS configuration by selecting (e.g., picking) the RS configuration with a lower RS configuration ID. For example, if RS config1 and config2 have same RSRP and/or CQI values, UE 104 and/or preferred CSI feedback reporting component 196 may select RS config1 as the preferred RS configuration as the configuration ID of RS config1 ("1") is lower than the configuration ID of RS config2 ("2"). In an additional or optional aspect, at block 625, methodology 600 may include monitoring, at the UE, different size bandwidths of at least one RS in different RS configurations.

In an aspect, at block 630, methodology 600 may include reporting the preferred RS configuration to the node via a beam selection indicator (BSI). For example, in an aspect, UE 104 and/or CSI feedback reporting component 192 may include a preferred RS configuration reporting component 198, such as a specially programmed processor module, or a processor executing specially programmed code stored in a memory, to report the preferred RS configuration, e.g., RS config1 to base station 102 via a BSI.

In an example of reporting the preferred RS configuration, UE 104 and/or CSI feedback reporting component 192 may report the preferred RS configuration, e.g., RS config1, via a parameter, e.g., a beam selection indicator (BSI), which indicates to base station 102 the RS configuration preferred and/or selected by the UE. The selection of the preferred RS configuration, as described above in reference to block 620, may be based on RSRP and/or CQI values of the RS transmissions received at the UE, where the RS transmissions are further based on the beamforming or precoding of the RS transmissions.

In another example of reporting the preferred RS configuration, UE 104 and/or CSI feedback reporting component 192 may report that the RSRP is high or low and/or CQI is good/bad based on comparing the RSRP and/or the CQI values with corresponding thresholds. The thresholds may be hardcoded at the UE or configurable for the UE. In one implementation, UE 104 and/or CSI feedback reporting component 192 may report the BSI to the base station 102 using one bit. For instance, UE 104 and/or CSI feedback reporting component 192 may transmit one bit which identifies the preferred RS configuration out of all the RS configurations configured at the UE.

In another example of reporting the preferred RS configuration, UE 104 and/or CSI feedback reporting component 192 may report the preferred RS configuration in a periodic manner. That is, UE 104 and/or CSI feedback reporting component 192 may report the preferred RS configuration every "X" number of seconds or "Y" number of frames. However, this may not be efficient, for example, in terms of power or bandwidth, specifically for static or semi-static devices such as mMTC devices. Therefore, in another implementation example of reporting the preferred RS configuration, UE 104 and/or CSI feedback reporting component 192 may report the preferred RS configuration in an aperiodic (i.e., not periodic) manner. For instance, UE 104 and/or CSI feedback reporting component 192 may report the preferred RS configuration when triggered by the base station 102, for example, in response to receiving of a RS transmission from the base station.

In another example of reporting the preferred RS configuration, UE 104 and/or CSI feedback reporting component 192 may report the preferred RS configuration by piggybacking (or piggyback reporting) on a UL data transmission or a UL control transmission. That is, UE 104 reports the preferred RS configuration, via a BSI, when the UE is sending user data or control information on the UL to the base station. The piggybacking of the BSI with UL data or control transmissions helps to conserve resources as there is no need to separately transmit the BSI to the base station 102. Further, the piggybacking does not affect the performance of mMTC devices (e.g., UE 104) or base station 104, specifically, static or low-mobility devices such as mMTC devices considering the quality of the channel may not frequently change. In another implementation of reporting the preferred RS configuration, UE 104 and/or CSI feedback reporting component 192 may tie (e.g., link) the reporting of the preferred RS configuration to an operating mode (e.g., low/high coverage mode) and/or mobility (low/high mobility) of a mMTC device and/or could be trigger based, for example, on grants, UL data transmission, UL control transmission, etc.

In one implementation, UE 104 may operate in one sub-band without hopping or multiple sub-bands with hopping between the multiple sub-bands. For example, when UE 104 is operating in one sub-band (e.g., sub-band 532) without hopping to/from other sub-bands, UE 104 and/or CSI feedback reporting component 192 may determine the preferred RS configuration based on the RS transmissions in the one sub-band 532 and may report the preferred configuration based on the RS transmissions received in the one sub-band 532. In an additional or optional aspect, when UE 104 operates in multiple (plurality, two or more, etc.) sub-bands, for example, sub-band 1 532 and sub-band 2 534, UE 104 and/or CSI feedback reporting component 192 may determine the preferred RS configuration based on the RS transmissions in either sub-band 1 532 or sub-band 2 534, or both the sub-bands together. In another example aspect, UE 104 and/or CSI feedback reporting component 192 may determine the preferred RS configuration for each of the sub-bands and report the preferred RS configuration for each of the sub-bands. In such an example aspect, UE 104 and/or UE 104 and/or CSI feedback reporting component 192 may report the preferred RS configurations, either separately or jointly via the BSI. Additionally, UE 104 and/or CSI feedback reporting component 192 may report the preferred RS configuration to the base station 104 during a time (e.g., a gap) when the UE 104 is hopping from one sub-band to another sub-band. Additionally, UE 104 may use the gap for RF re-tuning and reporting of the preferred RS configuration to the base station 102.

In an additional aspect, UE 104 may select a precoding for the UL based on the precoding of the DL. For example, UE 104 may determine the precoding of the DL based on the received RS transmissions and may select the same precoding for the UL, at least for time division duplex (TDD) where there is channel reciprocity. Additionally, the UE 104 may indicate the selected precoding for UL to the base station, especially upon switching of different beams/precoding.

As described above, UE 104 may determine the preferred RS configuration based on the RSRP and/or CQI values of the RS transmissions received from the base station 102 and report the preferred RS configuration to the base station 104. Thus, the channel state information (CSI) feedback may be reported by the UE to the base station in an efficient manner.

Figure 7:
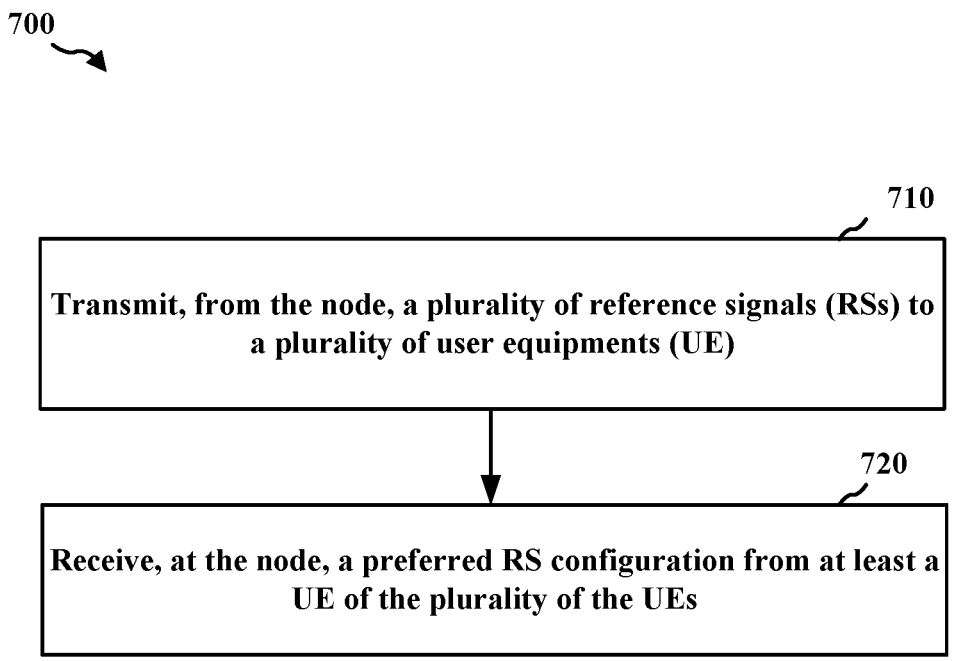
FIG. 7 is a flowchart illustrating a method for receiving CSI feedback at a base station.

FIG. 7 is a flowchart illustrating a method 700 for receiving channel state information (CSI) feedback at a base station.

In an aspect, at block 710, methodology 700 may include transmitting, from the node, a plurality of reference signals (RSs) to a user equipment (UE). For example, in an aspect, base station 102 and/or CSI feedback receiving component 182 may include a RS transmission component 184, such as a specially programmed processor module, or a processor executing specially programmed code stored in a memory, to transmit, from base station 104, a plurality of reference signals (RSs), e.g., RS 1 510 and RS 520 to a user equipment (UE). As described above in reference to FIG. 5, base station 102 may transmit a plurality of RSs, also referred to as RS transmissions. For example, base station 102 may transmit reference signals RS 1 510 and RS 2 520.

In an aspect, at block 720, methodology 700 may include receiving, at the node, a preferred RS configuration from at least a UE of the plurality of the UEs. For example, in an aspect, base station 102 and/or CSI feedback receiving component 182 may include a preferred RS configuration receiving component 186, such as a specially programmed processor module, or a processor executing specially programmed code stored in a memory, to receive, at base station 102, a preferred RS configuration, e.g., RS config1 from UE 104. The UE may determine the preferred RS configuration and report the preferred RS configuration to base station as described above in detail in reference to FIG. 6.

Figure 8:
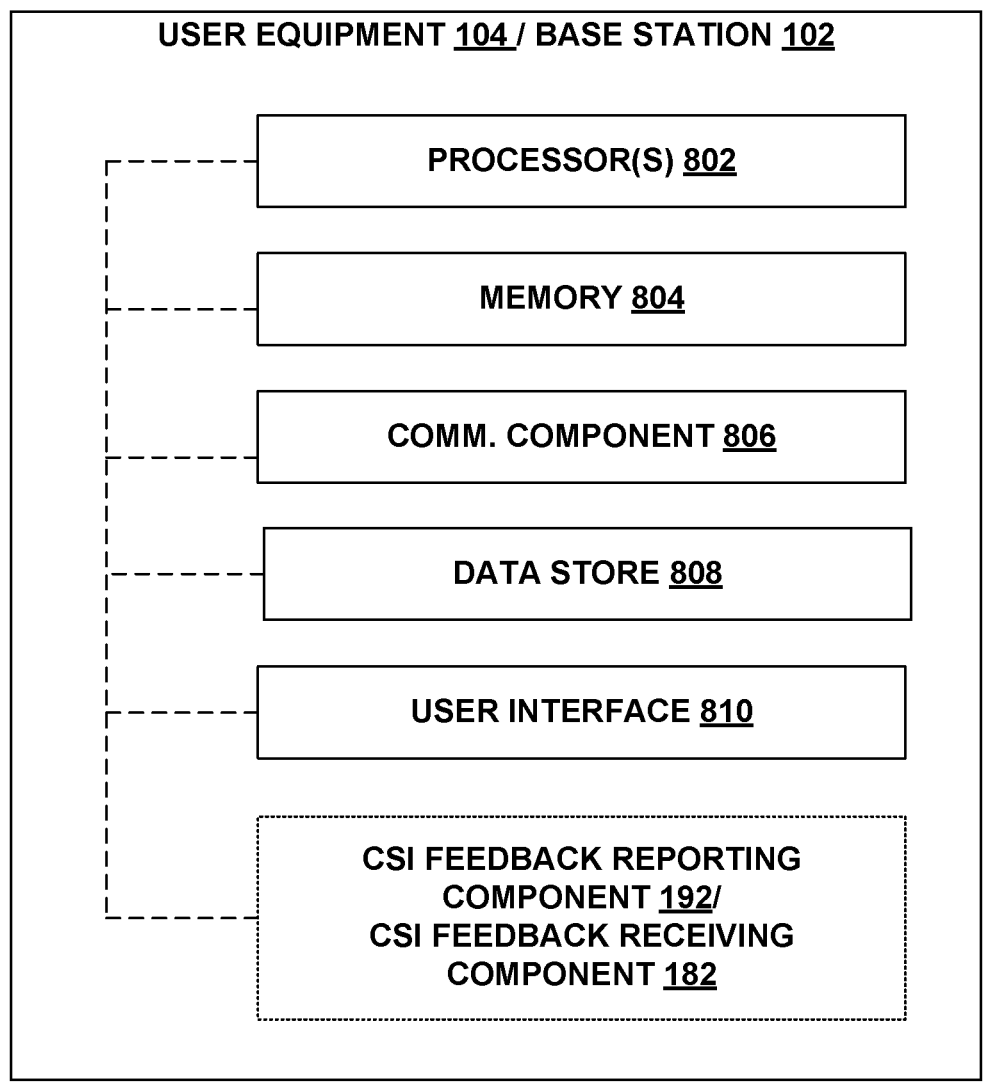
FIG. 8 is a block diagram conceptually illustrating an example hardware implementation for an apparatus employing a processing system configured in accordance with an aspect of the present disclosure.

Referring to FIG. 8, in an aspect, UE 104 including CSI feedback reporting component 192 and/or base station 102 including CSI feedback receiving component 182 may be or may include a specially programmed or configured computer device to perform the functions described herein. In one aspect of implementation, UE 104 and/or CSI feedback reporting component 192 may include one or more of the following components: RS configuration identifying component 194, preferred RS configuration determining component 196, and/or preferred RS configuration reporting component 198 for reporting channel state information (CSI) feedback by the UE. In an additional aspect of implementation, base station 102 and/or CSI feedback receiving component 182 may include one or more of the following components: RS transmission component 184 and/or preferred RS configuration receiving component 186 for receiving channel state information (CSI) feedback at the base station.

In an aspect, for example, as represented by the dashed lines, CSI feedback reporting component 192 and/or CSI feedback receiving component 182 may be implemented in or executed using one or any combination of processor 802 (same or similar to processor 359/375), memory 804 (same or similar to memory 360/376), communications component 806, and data store 808. For example, CSI feedback reporting component 192 and/or CSI feedback receiving component 182 may be executed on one or more processors 802. Further, for example, CSI feedback reporting component 192 and/or CSI feedback receiving component 182 may be defined as a computer-readable medium stored in memory 804 and/or data store 808 and executed by processor 802. Moreover, for example, inputs and outputs relating to operations of CSI feedback reporting component 192 and/or CSI feedback receiving component 182 may be provided or supported by communications component 806, which may provide a bus between the components of computer device 800 or an interface for communication with external devices or components.

UE 104 and/or base station 102 may include processor 802 specially configured to carry out processing functions associated with one or more of components and functions described herein. Processor 802 can include a single or multiple set of processors or multi-core processors. Moreover, processor 802 can be implemented as an integrated processing system and/or a distributed processing system.

UE 104 and/or base station 102 further includes memory 804, such as for storing data used herein and/or local versions of applications and/or instructions or code being executed by processor 802, such as to perform the respective functions of the respective entities described herein. Memory 804 can include any type of memory usable by a computer, such as random access memory (RAM), read only memory (ROM), tapes, magnetic discs, optical discs, volatile memory, non-volatile memory, and any combination thereof.

Further, UE 104 and/or base station 102 includes communications component 806 that provides for establishing and maintaining communications with one or more parties utilizing hardware, software, and services as described herein. Communications component 806 may carry communications between components on UE 104, as well as between user and external devices, such as devices located across a communications network and/or devices serially or locally connected to UE 104. Alternatively, communications component 806 may carry communications between components on base station 102, as well as between user and external devices, such as devices located across a communications network and/or devices serially or locally connected to base station 102. For example, communications component 806 may include one or more buses, and may further include transmit chain components and receive chain components associated with a transmitter and receiver, respectively, or a transceiver, operable for interfacing with external devices.

Additionally, UE 104 and/or base station 102 may further include data store 808, which can be any suitable combination of hardware and/or software, that provides for mass storage of information, databases, and programs employed in connection with aspects described herein. For example, data store 808 may be a data repository for applications not currently being executed by processor 802.

UE 104 may additionally include a user interface component 810 operable to receive inputs from a user of a UE 104, and further operable to generate outputs for presentation to the user. Alternatively, base station 102 may additionally include a user interface component 810 operable to receive inputs from a user of a base station 102, and further operable to generate outputs for presentation to the user. User interface component 810 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 810 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm operations described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The step/operation of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of reporting channel state information (CSI) feedback by a user equipment (UE), comprising:
   receiving, at the UE, a reference signal (RS) transmission from a node, wherein the RS transmission includes one or more reference signals (RSs);

identifying, at the UE, a plurality of RS configurations defined for the UE, wherein each of the plurality of RS configurations is associated with the RS transmission received from the node;

monitoring different narrowband RSs within the one or more RSs in the RS transmission, wherein the different narrowband RSs to be monitored are indicated by the plurality of RS configurations;

determining, based at least in part on the monitoring, a preferred RS configuration from the plurality of the RS configurations identified at the UE, wherein the UE operates in a plurality of sub-bands by hopping between the plurality of the sub-bands, and wherein determining the preferred RS configuration further comprises determining the preferred RS configuration based on the one or more RSs received in one or more sub-bands of the plurality of sub-bands; and reporting the preferred RS configuration to the node by transmitting, to the node, a beam selection indicator (BSI) that identifies the preferred RS configuration.

2. The method of claim 1, wherein a bandwidth of the narrowband is less than a system bandwidth associated with the node.

3. The method of claim 1, wherein determining the preferred RS configuration is based at least in part on the monitoring that further includes computing channel quality indicator (CQI) or reference signal received power (RSRP) values of RS transmissions received at the UE.

4. The method of claim 1, wherein each of the plurality of RS configurations identifies a set of resources of the RS configuration, one or more antenna ports, one or more sub-bands, or a periodicity of the RS transmission, or a combination thereof.

5. The method of claim 1, wherein the preferred RS configuration corresponds to a RS configuration that after the monitoring has a highest reference signal received power (RSRP), a highest channel quality indicator (CQI), or a combination thereof.

6. The method of claim 1, further comprising:
transmitting, to the node, one BSI for each of the one or more sub-bands associated with the RS configuration.

7. The method of claim 1, wherein reporting of the preferred RS configuration via the BSI is periodic.

8. The method of claim 1, further comprising:
receiving a trigger indication from the node; and
transmitting the BSI aperiodically in response to receiving the trigger indication.

9. The method of claim 1, wherein the BSI is based on a coverage mode or a mobility of the UE.

10. The method of claim 1, wherein transmitting the BSI further comprises:
piggybacking the BSI via an uplink (UL) data transmission or a UL control transmission.

11. The method of claim 1, wherein the UE operates in one sub-band without hopping, and wherein determining the preferred RS configuration further comprises:
determining the preferred RS configuration for the one sub-band based on the RS transmission received in the one sub-band.

12. The method of claim 1, wherein determining the preferred RS configuration further comprises:
determining the preferred RS configuration for each of the plurality of sub-bands based on a RS of the one or more RSs that is received in a respective sub-band of each of the plurality of the sub-bands.

13. The method of claim 12, wherein reporting the preferred RS configuration comprises reporting the preferred RS configuration for each of the plurality of sub-bands jointly or separately via one or more BSIs.

14. The method of claim 12, wherein reporting the preferred RS configuration comprises reporting the preferred RS configuration for the plurality of sub-bands during a period when the UE hops from one sub-band to another sub-band.

15. The method of claim 1, further comprising:
selecting a precoding for an uplink (UL) transmission from the UE based on a precoding of the preferred RS configuration as determined by the UE.

16. The method of claim 1, wherein at least one RS transmission is received over two or more sub-frames.

17. A method of receiving channel state information (CSI) feedback at a node, comprising:
transmitting, from the node, a plurality of reference signals (RSs) to a plurality of user equipments (UEs), wherein different narrowband RSs within the plurality of RSs are configured to be monitored by the plurality of UEs in accordance with different RS configurations supported by the plurality of UEs, and wherein the plurality of RSs are transmitted to one or more UEs of the plurality of UEs over one or more sub-bands from a plurality of sub-bands used by the one or more UEs to operate by hopping between the plurality of the sub-bands; and
receiving, at the node and in response to the transmission of the plurality of RSs, a preferred RS configuration from at least a UE of the plurality of the UEs, wherein a beam selection indicator (BSI) is received that identifies the preferred RS configuration.

18. The method of claim 17, wherein the each of the plurality of RSs is associated with a single antenna port at the node.

19. The method of claim 17, wherein each of the plurality of RSs is associated with a corresponding beamforming or precoding.

20. The method of claim 17, wherein the node is a 5G New Radio (NR) or the UE is a massive Machine Type Communications (mMTC) device.

21. An apparatus for reporting channel state information (CSI) feedback by a user equipment (UE), comprising:
a memory configured to store data; and
one or more processors communicatively coupled with the memory, wherein the one or more processors and the memory are configured to:
receive, at the UE, a reference signal (RS) transmission from a node, wherein the RS transmission includes one or more reference signals (RSs);
identify, at the UE, a plurality of RS configurations defined for the UE, wherein each of the plurality of RS configurations is associated with the RS transmission received from the node;
monitor different narrowband RSs within the one or more RSs in the RS transmission, wherein the different narrowband RSs to be monitored are indicated by the plurality of RS configurations;
determine, based at least on the monitoring, a preferred RS configuration from the plurality of the RS configurations identified at the UE, wherein the UE operates in a plurality of sub-bands by hopping between the plurality of the sub-bands, and wherein determining the preferred RS configuration further comprises determining the preferred RS configuration based on the one or more RSs received in one or more sub-bands of the plurality of sub-bands; and report the preferred RS configuration to the node by transmitting, to the node, a beam selection indicator (BSI) that identifies the preferred RS configuration.

22. The apparatus of claim 21, wherein a bandwidth of the narrowband is less than a system bandwidth associated with the node.

23. The apparatus of claim 21, wherein the one or more processors and the memory are configured to determine the preferred RS configuration based at least in part on the monitoring that further includes computing channel quality indicator (CQI) or reference signal received power (RSRP) values of RS transmissions received at the UE.

24. The apparatus of claim 21, wherein each of the plurality of RS configurations identifies a set of resources of the RS configuration, one or more antenna ports, one or more sub-bands, or a periodicity of the RS transmission, or a combination thereof.

25. An apparatus for receiving channel state information (CSI) feedback at a node, comprising:
- a memory configured to store data; and
- one or more processors communicatively coupled with the memory, wherein the one or more processors and the memory are configured to:
  - transmit, from the node, a plurality of reference signals (RSs) to a plurality of user equipments (UEs), wherein different narrowband RSs within the plurality of RSs are configured to be monitored by the plurality of UEs in accordance with different RS configurations supported by the plurality of UEs, and wherein the plurality of RSs are transmitted to one or more UEs of the plurality of UEs over one or more sub-bands from a plurality of sub-bands used by the one or more UEs to operate by hopping between the plurality of the sub-bands; and
  - receive, at the node and in response to the transmission of the plurality of RSs, a preferred RS configuration from at least a UE of the plurality of the UEs, wherein a beam selection indicator (BSI) is received that identifies the preferred RS configuration.

26. The apparatus of claim 25, wherein each of the plurality of RSs is associated with a corresponding beam or precoding.

27. The apparatus of claim 25, wherein the node is a 5G New Radio (NR) or the UE is a massive Machine Type Communications (mMTC) device.

* * * * *